(12) United States Patent
Hall et al.

(10) Patent No.: US 11,938,764 B2
(45) Date of Patent: Mar. 26, 2024

(54) TIRE INFLATION DEVICE

(71) Applicant: SRAM, LLC, Chicago, IL (US)

(72) Inventors: Michael Hall, Speedway, IN (US);
David Morse, Indianapolis, IN (US);
Louis Brown, Indianapolis, IN (US);
Miguel Navarro Baeza, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 454 days.

(21) Appl. No.: 17/034,745

(22) Filed: Sep. 28, 2020

(65) Prior Publication Data

US 2021/0094369 A1 Apr. 1, 2021

Related U.S. Application Data

(60) Provisional application No. 62/908,854, filed on Oct. 1, 2019.

(51) Int. Cl.
| | |
|---|---|
| *B60C 29/06* | (2006.01) |
| *B60B 1/00* | (2006.01) |
| *B60B 1/02* | (2006.01) |
| *B60B 21/00* | (2006.01) |
| *B60C 5/12* | (2006.01) |

(Continued)

(52) U.S. Cl.
CPC ............ *B60C 29/06* (2013.01); *B60B 1/003* (2013.01); *B60B 1/02* (2013.01); *B60B 21/00* (2013.01); *B60C 5/12* (2013.01); *F15D 1/02* (2013.01); *B60B 2200/47* (2013.01); *B60B 2900/531* (2013.01); *B60B 2900/541* (2013.01); *B60C 2200/12* (2013.01); *B60S 5/04* (2013.01)

(58) Field of Classification Search
CPC ....... B60C 5/12; B60C 29/06; B60C 2200/12; B60C 15/028; B60C 15/0209; B60B 1/003; B60B 1/02; B60B 21/00; B60B 21/12; B60B 2200/47; B60B 2900/531; B60B 2900/541; F15D 1/02
See application file for complete search history.

(56) References Cited

U.S. PATENT DOCUMENTS 4,558,728 A * 12/1985 Forneris ................ B60C 15/028
152/516
4,564,056 A * 1/1986 Doring .................... B60C 29/02
152/DIG. 13

(Continued)

FOREIGN PATENT DOCUMENTS

DE 102017124487 A1 * 4/2018 ........... B60C 15/028
EP 2605922 B1 * 9/2014 ............. B60C 17/01

(Continued)

OTHER PUBLICATIONS

Machine Translation of EP 2605922 B1, 4 pages (Year: 2014).*
Machine Translation of DE 102017124487 A1, 5 pages (Year: 2018).*

*Primary Examiner* — S. Joseph Morano
*Assistant Examiner* — Emily G. Castonguay

(57) ABSTRACT

An air deflector that is at least partially disposable within a tubeless tire of a bicycle wheel includes a body. The body includes at least one wall defining an air input end and an air output end of the body. The body is attachable to a valve of the tubeless tire at the air input end, such that when air is introduced into the body via the valve, at least some of the air is deflectable by one or more walls of the at least one wall out of the body at the air output end.

14 Claims, 16 Drawing Sheets

(51) Int. Cl.
*F15D 1/02* (2006.01)
*B60S 5/04* (2006.01)

(56)  References Cited

U.S. PATENT DOCUMENTS

| | | |
|---|---|---|
| 8,668,278 B2 | 3/2014 | Meggiolan |
| 10,703,149 B2 | 7/2020 | Krefting |
| 2007/0256769 A1* | 11/2007 | Douglas ................ B60C 5/142 |
| | | 152/339.1 |
| 2009/0250994 A1* | 10/2009 | Meggiolan ............ B60B 21/12 |
| | | 29/894.35 |
| 2016/0144673 A1 | 5/2016 | Spindler |
| 2018/0022168 A1 | 1/2018 | Dunning |
| 2018/0370305 A1 | 12/2018 | Krefting |
| 2019/0047333 A1* | 2/2019 | Meier .................. B60C 17/041 |

FOREIGN PATENT DOCUMENTS

| | | | | |
|---|---|---|---|---|
| GB | 692019 A | * | 5/1953 | ............ B60C 17/04 |
| GB | 2571980 A | * | 9/2019 | ............ B60C 17/04 |
| TW | I436904 | | 5/2014 | |

* cited by examiner

TIRE INFLATION DEVICE

PRIORITY

This application claims the benefit of U.S. Provisional Patent Application No. 62/908,854, filed Oct. 1, 2019, which is hereby incorporated by reference in its entirety.

BACKGROUND

1. Field of the Disclosure

The present disclosure is generally directed to an air deflector that facilitates tubeless tire seating during inflation.

2. Description of Related Art

A traditional bicycle wheel may include a rim formed of extruded metals or other materials that are bent and bonded into a circular shape having consistently shaped cross sections. Recently, other materials, such as carbon fiber reinforced plastics, have been used in the manufacture of bicycle rims, which may be formed into circular shapes through non-extrusion based processes. Carbon fiber reinforced plastics may, for example, be used.

The rim may be configured for the attachment of any number of different types of tires. For example, the rim may be configured for attachment of a tubeless clincher tire. The tubeless clincher tire includes beads that interact with a tire engaging portion of the rim. The tire engaging portion of the rim includes a rim bed that defines a well. The well provides a volume into which the beads of the tire may be placed when the tire is being attached to the rim.

The tubeless clincher tire is to be seated in bead walls that extend between hooks and the well on opposite sides of the well, respectively, to obtain a proper sealing between the tubeless clincher tire and the rim. The proper sealing prevents air leakages during and after inflation of the tubeless clincher tire.

Seating the tubeless clincher tire may require a high constant airflow input while the tire is being inflated. The most reliable way to produce the high constant airflow input may be to pump in compressed air using, for example, an air compressor. In many situations, however, a bicycle user does not have access to a compressed air source.

SUMMARY

In one example, an air deflector disposable at least partially within a tubeless tire of a bicycle wheel includes a body. The body includes at least one wall defining an air input end and an air output end of the body. The body is attachable to a valve of the tubeless tire at the air input end, such that when air is introduced into the body via the valve, at least some of the air is deflectable by one or more walls of the at least one wall out of the body at the air output end.

In one example, the body is a hollow body.

In one example, the body includes an input opening at the air input end of the body. An input air axis is a central axis extending through the input opening. The body also includes an output opening at the air output end of the body. The air output end of the body is at a distance relative to the input air axis.

In one example, the air output end faces in a direction that is at a positive acute angle relative to the input air axis.

In one example, the body is a bent tube or a curved tube.

In one example, the output opening is elliptical, square, rectangular, or circular.

In one example, the air output end is a first air output end, and the output opening is a first output opening. The body further has a second air output end. The body further includes a second output opening at the second air output end of the body.

In one example, the hollow body includes an input portion and an output portion. The input portion includes the air input end and the output portion including the first air input end and the second air input end. The input portion of the hollow body includes a first tubular wall of the at least one wall, and the output portion of the hollow body includes a second tubular wall of the at least one wall. The second tubular wall includes an opening extending from an outer surface of the second tubular wall and through the second tubular wall. The first tubular wall extends away from the second tubular wall at or adjacent to the opening through the second tubular wall, such that the air introduced into the hollow body via the valve flows into the output portion of the hollow body, is deflected by one or more inner surfaces of the second tubular wall, and exits the hollow body via the first output opening and the second output opening.

In one example, the output portion is curved along an arc that corresponds to a circumference of a rim of the bicycle wheel on which the air deflector is installable.

In one example, an outer surface of the output portion of the hollow body forms a peak or is rounded, such that the output portion of the hollow body is configured to space beads of the tubeless tire, in which the air deflector is disposable, apart from each other.

In one example, the air deflector further includes an air directing member positioned at the opening through the second tubular wall. The air directing member extends into the output portion of the hollow body.

In one example, the air deflector further includes a support structure disposed in, on, or in and on the hollow body. The hollow body is made of a first material, and the support structure is made of a second material, the second material having a greater rigidity than the first material.

In one example, the support structure includes a helical structure in or on the hollow body, a lattice structure in the hollow body, or a combination thereof.

In one example, an air deflection assembly for a tubeless tire for a bicycle wheel includes a hollow body that is disposable within a volume between a rim and the tubeless tire of the bicycle wheel. The hollow body has an air input end and an air output end. An air input axis is a central axis that extends through the air input end of the hollow body. The air deflection assembly further includes a valve attached to the hollow body at the air input end. The hollow body is shaped, such that when air is introduced into the hollow body via the valve, the hollow body deflects the air away from the air input axis and at least some of the air out of the hollow body at the air output end.

In one example, the hollow body has a threaded portion at the air input end, and the valve is threadably attached to the hollow body via the threaded portion of the hollow body.

In one example, a wheel for a bicycle includes a central hub configured for rotational attachment to the bicycle. The wheel also includes a plurality of spokes attached to the central hub and extending radially outward from the hub. The wheel includes a rim. The rim includes a radially inner portion disposed along an inner circumference of the rim. The plurality of spokes are attached to the radially inner portion of the rim. The rim also includes a first sidewall and a second sidewall spaced apart from the first sidewall. The first sidewall and the second sidewall extend radially outward from the radially inner portion. The rim includes a radially outer tire engaging portion disposed along an outer circumference of the rim. The radially outer tire engaging portion extends from the first sidewall and the second sidewall, respectively. The rim includes a rim bed opposite the radially inner portion. The rim bed is between the first sidewall and the second sidewall and defining a well. The rim also includes an opening extending from the radially inner portion of the rim, through the rim to the rim bed. The wheel also includes a tire attached to the rim at the radially outer tire engaging portion of the rim, and an air deflection assembly. The air deflection assembly includes a hollow body positioned within a volume between the rim bed and the tire. The hollow body has an air input opening and an air output opening. An air input axis is a central axis that extends through the air input opening of the hollow body. The air input axis is in a direction towards an inner surface of the tire. The air deflection assembly also includes a valve extending through the opening through the rim. The valve is aligned with the air input opening of the hollow body, such that air that is introduced into the volume via the valve flows through the hollow body. The hollow body is shaped, such that when the air is introduced into the volume via the valve, the hollow body deflects the air away from the air input axis and at least some of the air out of the hollow body at the air output end.

In one example, the hollow body has an input portion and an output portion. The input portion includes the air input end, and the output portion includes the air output end. The output portion is curved, such that a curve of the output portion corresponds to a circumference of the rim bed. When the air is introduced into the hollow body via the valve, the output portion of the hollow body deflects at least some of the air out of the hollow body at the air output end in a circumferential direction defined by the rim.

In one example, the input portion of the hollow body is a seal that is disposed within the opening through the rim.

In one example, the hollow body of the air deflection assembly is attached to the rim. The hollow body is made of a same material as the rim.

In one example, an air output axis is a central axis that extends through the air output end of the hollow body. A bisecting midplane formed by the air input axis and the air output axis is coplanar with a bisecting midplane of the rim, or the bisecting midplane formed by the air input axis and the air output axis is at an angle relative to the bisecting midplane of the rim, the bisecting midplane of the rim being perpendicular to an axis of rotation of the wheel.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
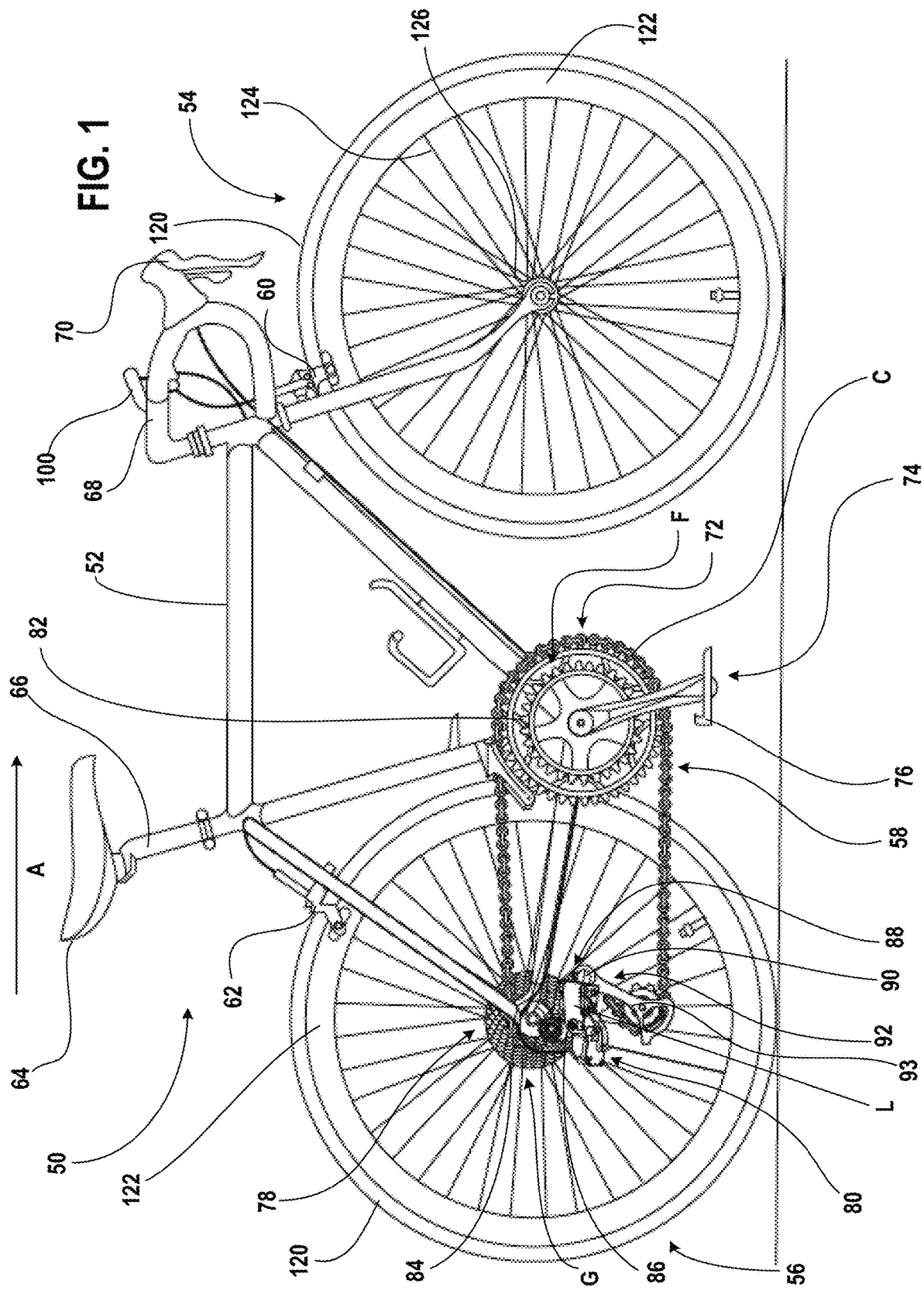
FIG. 1 is a side view schematic of a bicycle that may be constructed to utilize a wheel including an air deflector.

When airflow is introduced through a conventional tubeless tire air valve, air outputs out of the air valve radially to a circumference defined by a bicycle wheel. Thus, the airflow impacts a tubeless clincher tire radially and generates a radial force on the tubeless clincher tire. This radial force may prevent the tubeless clincher tire from seating in bead walls of a rim during installation of the tubeless clincher tire on the rim.

A tubeless clincher tire may be easier to seat when the air output out of the air valve is directed circumferentially relative to the rim, instead of radially. The present disclosure provides examples of air deflectors, rim assemblies, and wheels that solve or improve upon one or more of the above-noted and/or other disadvantages with prior known rims and wheels. The disclosed air deflectors include an attachment portion that attaches the air deflector to the air valve, and a deflection member having one or more air outputs. The attachment portion extends away from a side of the deflection member. The one or more air outputs of the deflection member are oriented relative to the tubeless clincher tire, such that the air output out of the air valve into the air deflector via the attachment portion is redirected by the deflection member to minimize the radial force on the tubeless clincher tire during inflation.

The attachment between the air deflector, via the attachment portion, and the air valve is airtight sealed. The air valve is introduced through an air valve hole of the rim, and the air deflector is attached to the air valve via, for example, a threaded connection. During inflation of the tubeless clincher tire on the rim, the air deflector deflects the air into one or more airflows via one or more outputs of the air deflector.

A wheel on which a tubeless clincher tire is to be installed has a bisecting midplane that is normal to an axis of the wheel. An air input axis for the air deflector coincides with a center of an input section of the air deflector, and is normal to the input section. An air output axis for the air deflector coincides with a center of a respective output section, and is normal to the respective output section. The air deflector has a bisecting midplane that is defined by the air input axis and the air output axis.

The air deflector is introduced within the tubeless clincher tire and positioned, such that the bisecting midplane of the air deflector coincides with the bisecting midplane of the wheel. Alternatively, the air deflector may be positioned within the tubeless clincher tire, such that the bisecting midplane of the air deflector forms an angle with the bisecting midplane of the wheel.

Air flows from an air source such as, for example, a floor pump, through an input of the air valve, to an output of the air valve. The air then flows through an input of the air deflector (e.g., the attachment portion or an input portion), which is attached to the air valve. In order to reduce or eliminate a radial force on an inner surface of the tubeless clincher tire from the inflating airflow, which prevents seating of tire beads, the air from the air source is to impact the tire in a number of directions other than the radial direction. The air is deflected within the deflection member (e.g., an output portion) of the air deflector and directed to one or more distinct directions. The air exits the air deflector via the one or more air outputs, which are positioned at one or more respective distances from the air input axis.

An output section may be any number of different shapes including, for example, circular, rectangular, oval-shaped, or another shape. The air exits the air deflector in the direction of the respective output axis. The air deflector may include air directing features such as, for example, ribs, ridges, and/or other features, that improve air deflection efficiency through the air deflector.

The air deflector may be made of a rigid material or a compliant material. In one example, the air deflector is attached to the rim instead of the valve and is made of a same material as the rim. The air deflector works under high pressures. When the air deflector is made of a compliant material, the air deflector may include supports, as part of, for example, a lattice structure. The supports help maintain a shape of the air deflector to prevent the air deflector from collapsing and/or the one or more outputs from closing during inflation of the tire.

The air deflector may include a section configured to separate the tire beads from each other and push the tire beads towards the bead walls of the rim, respectively, which may aid the tire bead seating process. The section includes a mid-portion that has a high variation in a slope of a tangent line compared to other examples of the air deflector.

A significant advantage of the disclosed air deflectors is that the deflection of airflow during inflation of a tubeless clincher tire away from a radial direction and towards a circumferential direction makes the rim easier to seal and allows for easier tire seating.

Turning now to the drawings, FIG. 1 generally illustrates a bicycle 50 that employs wheel assemblies including air deflectors constructed in accordance with the teachings of the present disclosure. The bicycle 50 includes a frame 52, a front wheel 54 and a rear wheel 56 each rotatably attached to the frame 52, and a drivetrain 58. A front brake 60 is provided for braking the front wheel 54, and a rear brake 62 is provided for braking the rear wheel 56. The bicycle 50 also generally has a seat 64 near a rear end of the frame 52 and carried on an end of a seat tube 66 connected to the frame 52. The bicycle 50 also has handlebars 68 near a forward end of the frame 52. A brake lever 70 is carried on the handlebars 68 for actuating the front brake 60, the rear brake 62, or both the front brake 60 and the rear brake 62. If the brake lever 70 actuates only one of the front brake 60 and the rear brake 62, a second brake lever (not shown) may also be provided to actuate the other brake. A front and/or forward riding direction or orientation of the bicycle 50 is indicated by the direction of the arrow A in FIG. 1. As such, a forward direction for the bicycle 50 is indicated by the direction of arrow A. While the illustrated bicycle 50 depicted in FIG. 1 is a road bike with drop-style handlebars 68, the present disclosure may be applicable to bicycles of any type, including, for example, mountain bikes with flat-style handlebars 68.

The drivetrain 58 has a chain C and a front sprocket assembly 72, which is coaxially mounted with a crank assembly 74 having pedals 76. The drivetrain 58 also includes a rear sprocket assembly 78 coaxially mounted with the rear wheel 56 and a rear gear change mechanism, such as a rear derailleur 80.

As is illustrated in FIG. 1, the front sprocket assembly 72 may include one or more coaxially mounted chain rings, gears, or sprockets. In this example, the front sprocket assembly 72 has two sprockets F each having teeth 82 around a respective circumference, though the front sprocket assembly 72 may include more or fewer sprockets F. As shown in FIG. 1, the rear sprocket assembly 78 may include a plurality (e.g., eight) of coaxially mounted gears, cogs, or sprockets G. Each sprocket G also has teeth 84 arranged around a respective circumference. The number of teeth 84 on the smaller diameter rear sprocket G may be less than the number of teeth on the larger diameter rear sprocket G. The number of teeth 84 on the rear sprockets G may gradually decrease from the largest diameter rear sprocket G to the smallest diameter sprocket G. Though not described in any detail herein, in one embodiment, a front gear changer may be operated to move from a first operating position to a second operating position to move the chain C between the at least two front sprockets F. Likewise, the rear derailleur 80 may be operable to move between, for example, eight different operating positions to switch the chain C to a selected one of the rear sprockets G. In an embodiment, the rear sprocket assembly 72 may have more or fewer sprockets. For example, in an embodiment, a rear sprocket assembly may have ten, eleven, or twelve sprockets G. Dimensions and a configuration of the rear derailleur 80 may be modified to accommodate a specific implemented plurality of sprockets G. For example, an angle and length of the linkage and/or the configuration of the cage of the rear derailleur 80 may be modified to accommodate specific sprocket combinations.

The rear derailleur 80 is depicted as a mechanically actuated derailleur. In other embodiments, a wireless, electrically actuated rear derailleur may be provided. The rear derailleur 80 is mounted or mountable to the frame 52, or frame attachment, of the bicycle 50. The rear derailleur 80 has a base member 86 (e.g., a b-knuckle) that is mounted to the bicycle frame 52. A linkage 88 has two links L that are pivotally connected to the base member 86 at a base member linkage connection portion. A movable member 90 (e.g., a p-knuckle) is connected to the linkage 88 at a moveable member linkage connection portion. A chain guide assembly 92 (e.g., a cage) is configured to engage and maintain tension in the chain and has one or more cage plates 93 with a proximal end that is pivotally connected to a part of the movable member 90. The cage plate 93 may rotate or pivot about a cage rotation axis in a damping direction and a chain tensioning direction. Other gear changing systems, such as hydraulically controlled and/or actuated systems may also be used.

For the electrically actuated rear derailleur 80, a motor module may be carried on the electric rear derailleur 80 with a battery. The battery supplies power to the motor module. In one example, the motor module is located in the movable member 90. However, the motor module may instead be located elsewhere, such as in one of the links L of the linkage 88 or in the base member 86. The motor module may include a gear mechanism or transmission. As is known in the art, the motor module and gear mechanism may be coupled with the linkage 88 to laterally move the cage plate 93 and thus switch the chain C among the rear sprockets G on the rear sprocket assembly 78.

The cage plate 93 also has a distal end that carries a tensioner cog or wheel 94. The wheel 94 also has teeth around a circumference. The cage plate 93 is biased in the chain tensioning direction to maintain tension in the chain C. The chain guide assembly 92 may also include a second cog or wheel (not shown), such as a guide wheel disposed nearer the proximal end of the cage plate 93 and the movable member 90. In operation, the chain C is routed around one of the rear sprockets G. An upper segment of the chain C extends forward to the front sprocket assembly 72 and is routed around one of the front sprockets F. A lower segment of the chain C returns from the front sprocket assembly 72 to the tensioner wheel 94 and is then routed forward to the guide wheel. The guide wheel directs the chain C to the rear sprockets G. Lateral movement of the cage plate 93, tensioner wheel 94, and guide wheel may determine the lateral position of the chain C for alignment with a selected one of the rear sprockets G.

The bicycle 50 may include one or more bicycle control devices 100 mounted to the handlebars 68. The bicycle control devices 100 may include one or more types of bicycle control and/or actuation systems. For example, the bicycle control devices 100 may include brake actuation systems to control the front brake 60 and/or the rear brake 62, and/or gear shifting systems to control the drivetrain 58. Other control systems may also be included. For example, the system may be applied, in some embodiments, to a bicycle where only a front or only a rear gear changer is used. Also, the one or more bicycle control devices 100 may also include suspension and/or other control systems for the bicycle 50.

The front wheel 54 and/or the rear wheel 56 of the bicycle 50 may include a tire 120 attached to a radially outer tire engaging portion of a rim 122. A plurality of spokes 124 are attached directly to the rim 122 with any number of connectors including, for example, nipples. Other connectors may be used. Alternatively, the spokes 124 may be attached and/or secured to the rim 122 with other structural components. The spokes 124 extend from the rim 122 and attach to a central hub 126. The spokes 124 are maintained with a tension between the rim 122 and the central hub 126 to provide the respective wheel 54, 56 with an operational rigidity for use on the bicycle 50. The central hub 126 is configured for rotational attachment to the bicycle frame 52.

Figure 2:
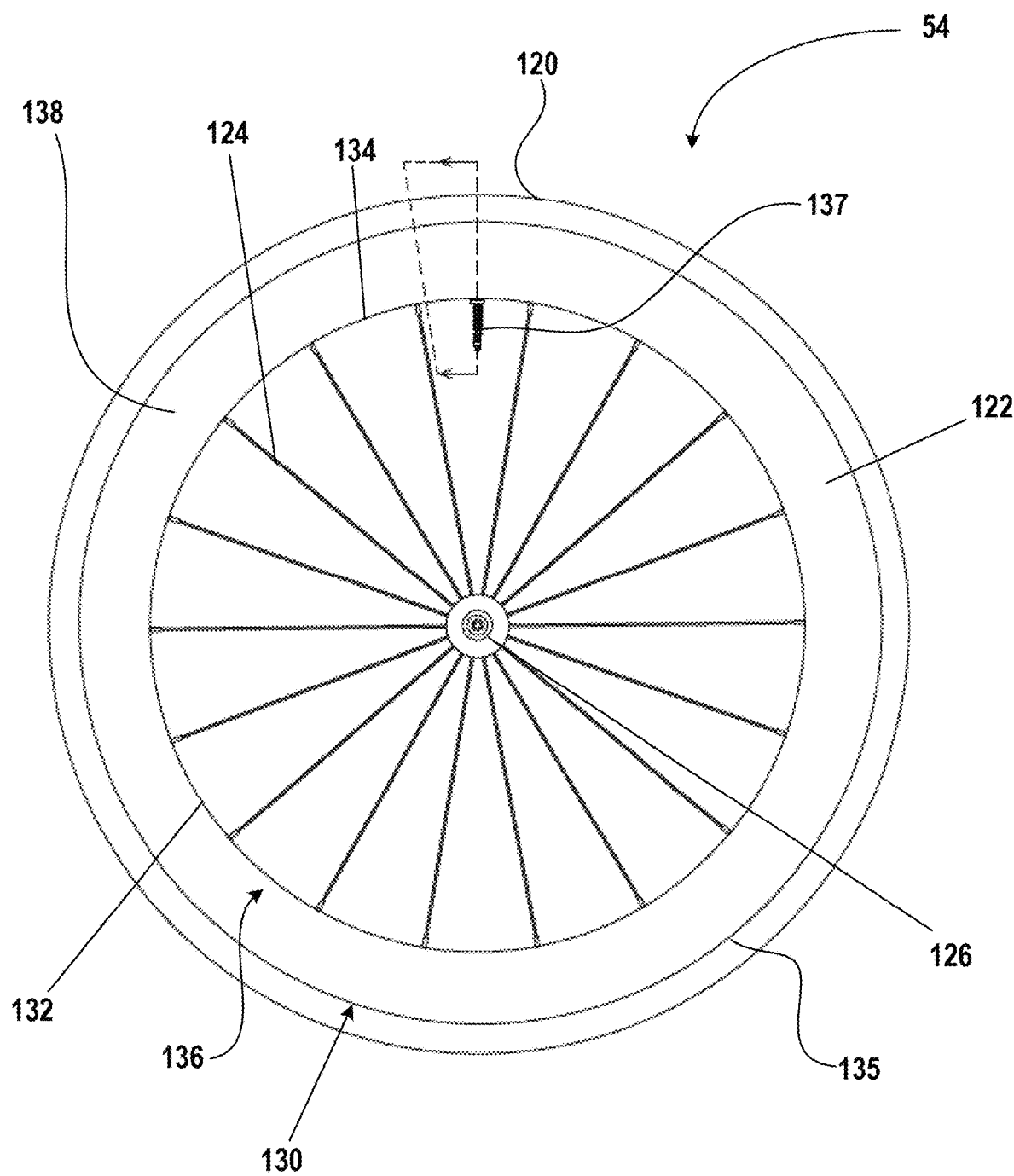
FIG. 2 is a side view of a wheel for a bicycle, such as the bicycle of FIG. 1.

FIG. 2 illustrates one embodiment of a bicycle wheel having a rim 122, spokes 124, and a central hub 126, such as the front wheel 54 of FIG. 1, removed from the rest of the bicycle 50. The bicycle wheel 54 illustrated in FIG. 2 has a tire 120 (e.g., a tubeless clincher tire) attached. The rim 122 includes a tire engaging portion 130 to engage with the tire 120, as is shown in FIG. 1. The tire engaging portion 130 is configured radially outward of a spoke receiving surface 132 that is disposed along an inner circumference 134 of the rim 122. In other words, the tire engaging portion 130 is a radially outer tire engaging portion. In an embodiment, the tire engaging portion 130 is disposed along an outer circumference 135 of the rim 122. The tire engaging portion 130 is configured for attachment to tires using clincher tire attachment configurations for tires including beaded interlock attachments. Other configurations of the tire engaging portion 130 may also be provided to allow for the use of other types of tires on the rim 122.

The rim 122 provides structure for attachment of the spokes 124 to the rim 122 at a receiving portion of the rim 122, proximate to the spoke receiving surface 132. As such, the spoke receiving surface 132 is part of a spoke engaging portion 136 (e.g., a radially inner portion) of the rim 122. In an embodiment, the spoke engaging portion 136 of the rim 122 is disposed along the inner circumference 134 of the rim 122. In another embodiment, the spoke receiving surface 132 and the spoke engaging portion 136 may be separate parts and/or portions of the rim 122. For example, the spokes 124 may pass through the spoke receiving surface 132, and the structure for attachment to the rim 122 may be provided proximate to the tire engaging portion 130.

The front wheel 54 illustrated in FIG. 2, for example, includes a valve 137 that extends through the rim 122. The valve 137 also extends away from the spoke engaging portion 136 of the rim 122, and the tire 120 may be inflated via the valve 137.

The rim 122 includes a first sidewall 138 and a second sidewall 139 (see FIG. 3) that extend between the tire engaging portion 130 and the spoke engaging portion 136. For example, the first sidewall 138 and the second sidewall 139 extend radially outward from the spoke engaging portion 136 to the tire engaging portion 130. The first sidewall 138 is spaced apart from the second sidewall 139.

In one embodiment, at least part of the rim 122 (e.g., the first sidewall 138 and the second sidewall 139) is formed by one or more composite materials. In one embodiment, the entire rim 122 is formed by carbon-fiber reinforced plastic. The rim 122 may, however, be formed of other materials and/or material combinations. In one example, carbon-fiber reinforced plastic forms a one-piece unitary rim of a singular collection of carbon-fiber layers including the tire engaging portion 130, the first sidewall 138, the second sidewall 139, and the spoke engaging portion 136. Other configurations may also be provided.

The front wheel 54 and the rear wheel 56 may include rims 122 configured for any size wheel. In an embodiment, the rims 122 are configured for use in wheels conforming to a 700 C (e.g. a 622 millimeter diameter clincher and/or International Standards Organization 622 mm) bicycle wheel standard. Other wheel standard sizes may also be used.

The front wheel 54 and the rear wheel 56 may rotate about the central hub 126 in either direction. For example, as shown in FIG. 2, the front wheel 54 and the rear wheel 56 may be configured to rotate in a particular rotational direction about the central hub 126. In another example, the front wheel 54 and the rear wheel 56 may be configured to rotate in a direction opposite the particular rotational direction.

Figure 3:
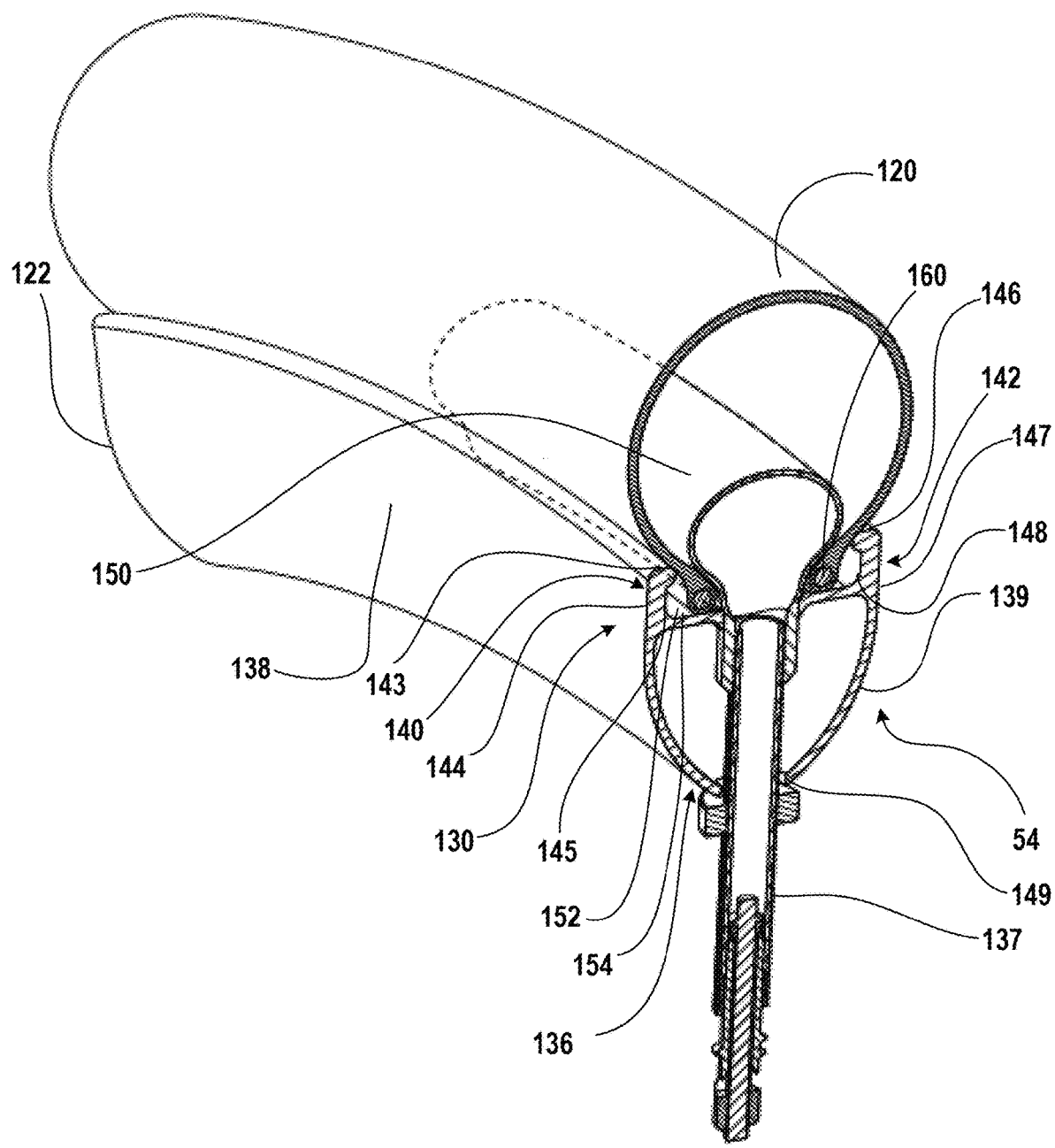
FIG. 3 is a close-up perspective view of a cross-section of a wheel including a first embodiment of an air deflector, with a tubeless tire unseated.
Figure 4:
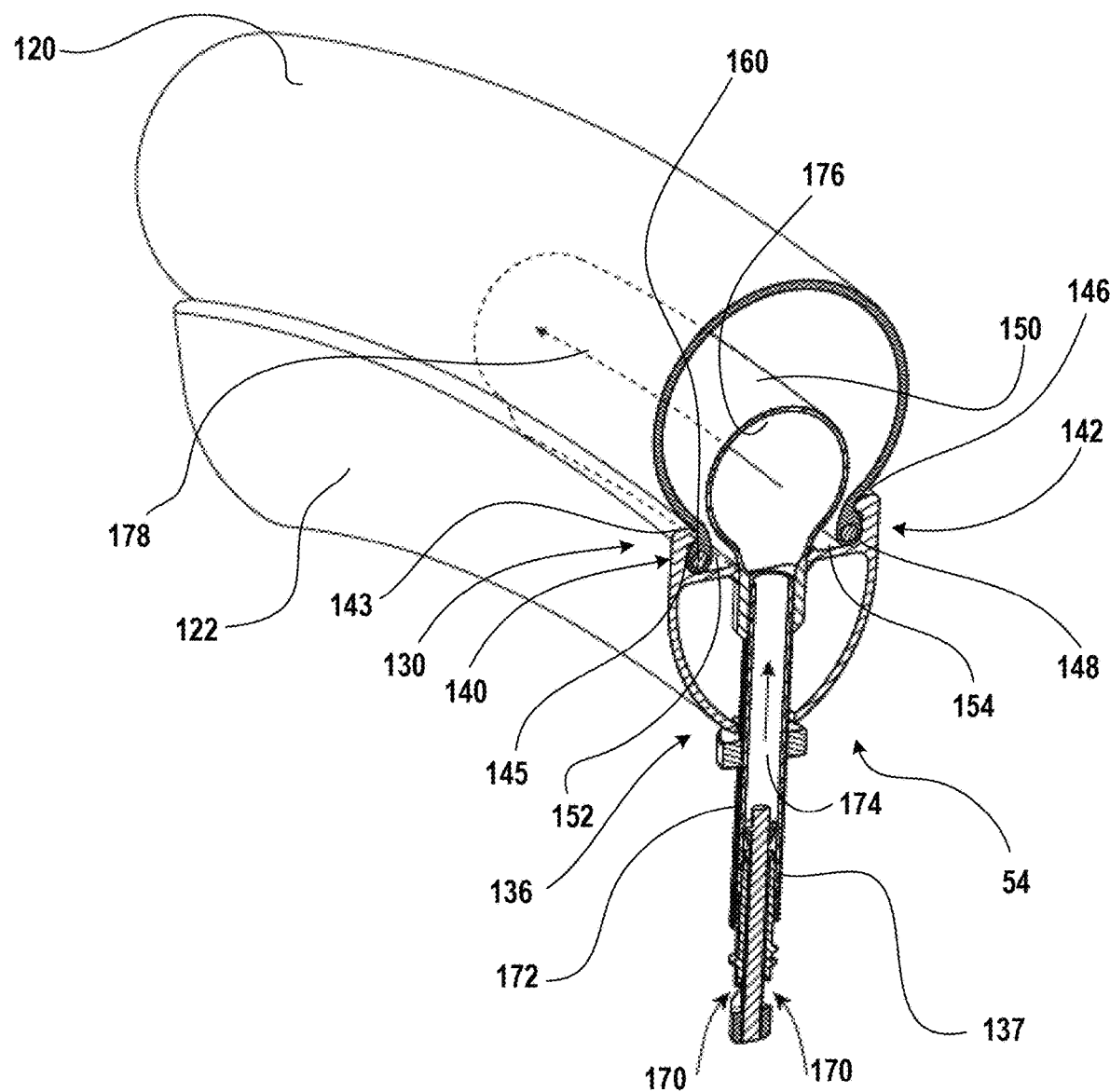
FIG. 4 is a close-up perspective view of a cross-section of the wheel of FIG. 3, with the tubeless tire seated.
Figure 5:
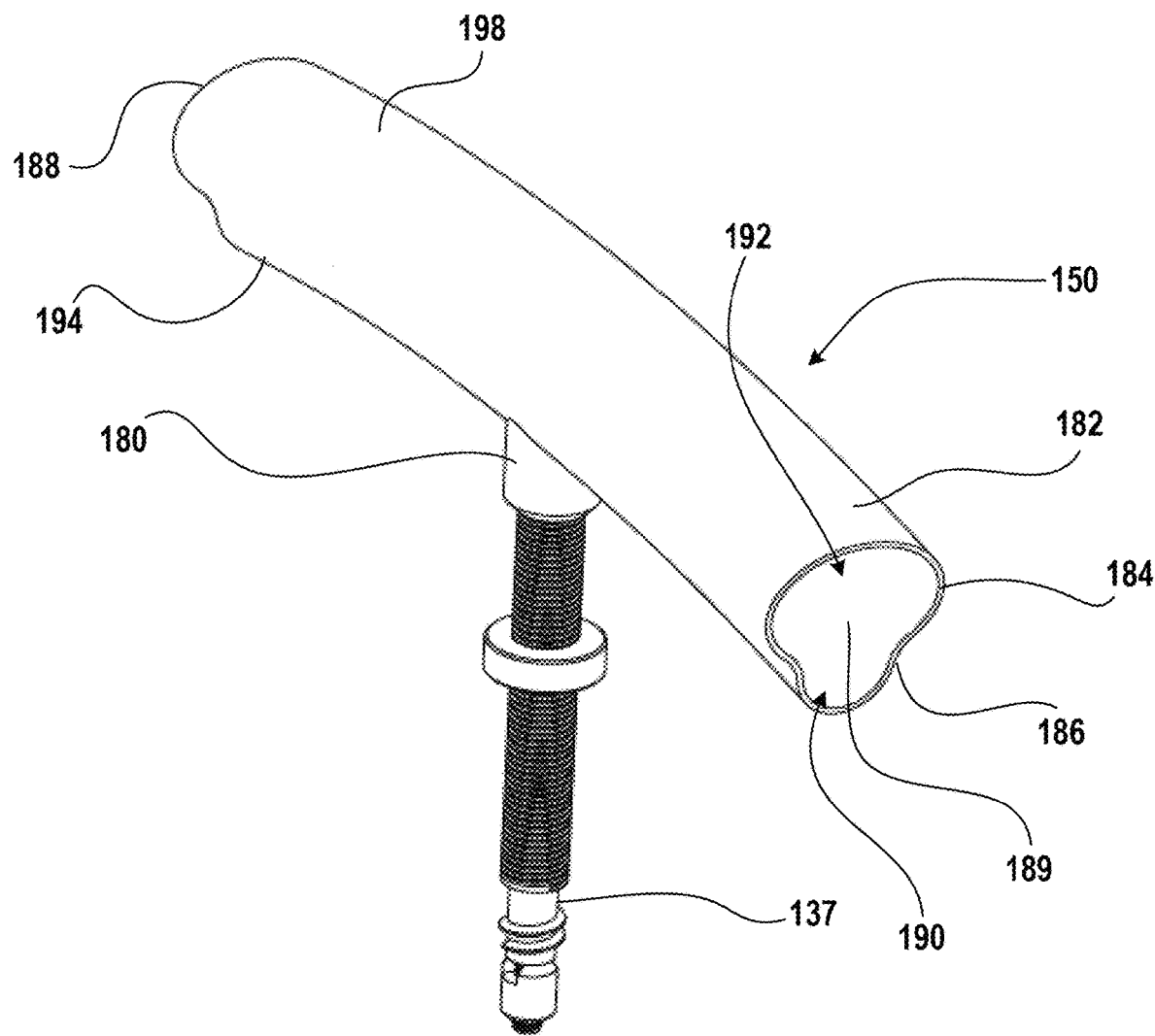
FIG. 5 is a perspective view of the first embodiment of the air deflector of FIG. 3 attached to an air valve.
Figure 6:
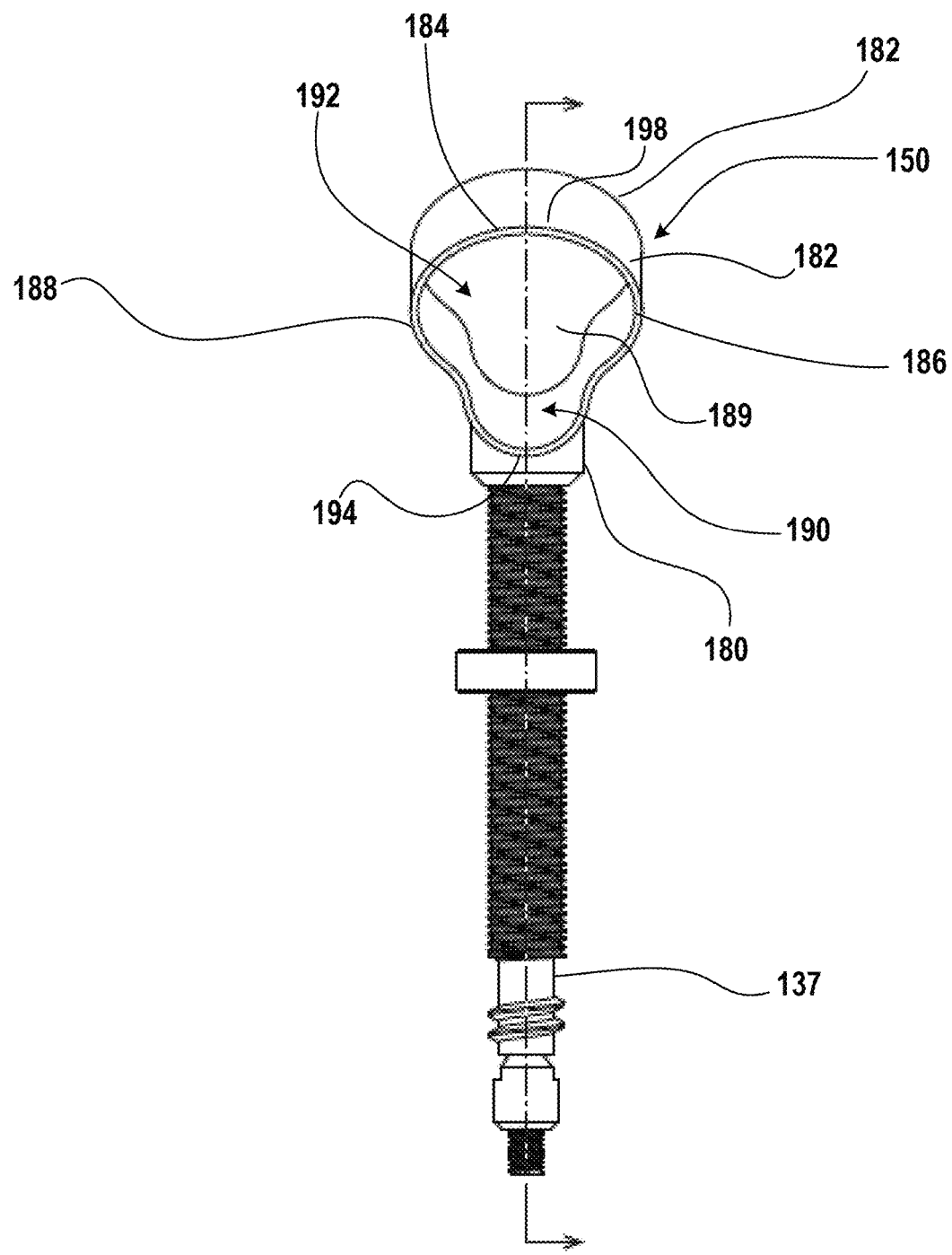
FIG. 6 is a side view of the first embodiment of the air deflector of FIG. 3 attached to an air valve.

FIG. 3 is a close-up perspective view of a cross-section of the front wheel 54 shown in FIG. 2, with a first embodiment of an air deflector. In FIG. 3, the tire 120 is unseated, and in FIG. 4, the tire 120 is seated. In one embodiment, the rear wheel 56 takes the same form as illustrated in FIGS. 3 and 4. The tire 120 is attachable to the rim 122 at the tire engaging portion 130 of the rim 122.

The radially outer tire engaging portion 130 includes a first tire retaining portion 140 and a second tire retaining portion 142 spaced apart from the first tire retaining portion 140. The first tire retaining portion 140 extends from the first sidewall 138, and the second tire retaining portion 142 extends from the second sidewall 139. The first sidewall 138 and the second sidewall 139 extend radially inward from the radially outer tire engaging portion 130.

The first tire retaining portion 140 includes a first protrusion 143 (e.g., a first bead retaining structure), a first outer wall 144, and a first tire retaining wall 145 opposite and spaced apart from the first outer wall 144. The first protrusion 143 extends between the first outer wall 144 and the first tire retaining wall 145. For example, the first protrusion 143 extends from the first outer wall 144 to the first tire retaining wall 145. In one example, the first protrusion 143 extends from the first tire retaining wall 145, towards the second tire retaining portion 142. At least a portion of the first protrusion 143 may form any number of shapes including, for example, a first hook.

The second tire retaining portion 142 includes a second protrusion 146 (e.g., a second bead retaining structure), a second outer wall 147, and a second tire retaining wall 148 opposite and spaced apart from the second outer wall 147. The second protrusion 146 extends between the second outer wall 147 and the second tire retaining wall 148. For example, the second protrusion 146 extends from the second outer wall 147 to the second tire retaining wall 148. In one example, the second protrusion 146 extends from the second tire retaining wall 148, towards the first tire retaining portion 140. At least a portion of the second protrusion 146 may form any number of shapes including, for example, a second hook.

The rim 122 includes an opening 149 (e.g., a through hole), through which the valve 137 extends. The through hole 149 extends from the spoke engaging portion 136 of the rim 122, into and through the rim 122. The through hole 149 may be sized and/or shaped to allow at least the valve 137 to extend through the opening 149. For example, the through hole 149 is sized and/or shaped to match a size and/or shape of a valve assembly including the valve 137 and an air deflector 150. In one embodiment, an interface between the air deflector 150 and the rim 122 (e.g., at the through hole 149) includes a sealing member such as, for example, at least one airtight gasket. In one embodiment, part of the air deflector 150 (e.g., the input portion) acts at the sealing member.

Referring to FIGS. 3 and 4, a first embodiment of the air deflector 150 is attached to the valve 137 and is disposed in a well 152 at least partially defined by a rim bed 154 of the tire engaging portion 130 of the rim 122. The rim bed 154 is formed by one or more surfaces of the tire engaging portion 130 and extends between the first tire retaining portion 140 (e.g., the first tire retaining wall 145) and the second tire retaining portion 142 (e.g., the second tire retaining wall 148). The one or more surfaces of the rim bed 154 define a well 152 with a cross section having any number of shapes including, for example, a rectangle or a trapezoid. Other cross-sectional shapes may be provided.

The tire 120 is, for example, a tubeless clincher tire. The tire 120 includes beads 160 that interact with the radially outer tire engaging portion 130 (e.g., the first tire retaining portion 140 and the second tire retaining portion 142) of the rim 122 to attach the tire 120 to and maintain the tire 120 on the rim 122. The beads 160 may include any number of materials within the beads 160, such as, for example, a steel wire or aramid (e.g., Kevlar™) fiber, to prevent the tire 120 from moving off of the rim 122. Due to the reinforcement with the steel wire or the Kevlar™ fiber, for example, the beads 160 resist stretching from internal air pressure. Alternatively, the beads 160 may be made of a same material as the tire 120 (e.g., rubber).

The well 152 provides a volume into which the beads 160 of the tire 120 may be placed when the tire 120 is being attached to the rim 122. As the tire 120 is inflated, the beads 160 of the tire 120 move away from each other until the beads 160 interact with the first tire retaining portion 140 (e.g., the first tire retaining wall 145) and the second tire retaining portion 142 (e.g., the second tire retaining wall 148), respectively. As shown in FIG. 4, when inflated, the beads 160 of the tire 120 abut the first tire retaining wall 145 and the second tire retaining wall 148, respectively. At least part of the first protrusion 143 (e.g., the first hook) and at least part of the second protrusion 146 (e.g., the second hook), for example, keep the beads 160 of the tire 120 positioned within the radially outer tire engaging portion 130 (e.g., keep the beads 160 of the tire 120 engaged with the first tire retaining wall 145 and the second tire retaining wall 148) and thus keep the tire 120 from blowing off the rim 122. The contact between the beads 160 and the first tire retaining wall 145 and the second tire retaining wall 148, respectively, forms a seal between the inflated tire 120 and the rim 122. In some applications, hooks are not required.

As the tire 120 is inflated via the valve 137, the air input via the valve 137 is output into a volume between the rim 122 and the tire 120 radially towards an outer circumference of the wheel 54, 56. The air impacts the tire 120 radially and produces a radial force that prevents the tire 120 from seating in the first tire retaining wall 145 and the second tire retaining wall 148, respectively. Referring to FIG. 4, the air deflector 150 deflects the air moving out of the valve 137 radially towards the outer circumference of the wheel 54, 56, such that the radial force on the tire 120 from the air impacting the tire 120 during inflation is reduced or eliminated. For example, the air deflector 150 redirects the air into a circumferential direction defined by the rim 122 and/or the tire 120 instead of a radial direction.

Air is input into the valve 137 with, for example, an air compressor (see arrows 170), and the air moves through a body 172 of the valve 137 (see arrow 174). The air then enters the air deflector 150, which is attached to the valve 137, and exits the valve 137. Within the air deflector 150, at least one inner surface 176 of the air deflector 150 redirects (e.g., deflects) the air into one or more airflows (see arrow 178). The air then exits the air deflector 150 into the volume between the rim 122 and the tire 120. The deflected airflow may, for example, be tangential to the outer circumference 135 of the rim 122 at an output of the air deflector 150.

Referring to FIGS. 5-8, which illustrate the first embodiment of the air deflector 150 attached to the valve 137, the air deflector 150 (e.g., a body) includes an attachment portion 180 (e.g., an input portion) and a deflection member 182 (e.g., an output portion). The attachment portion 180 extends away from a side of the deflection member 182.

The deflection member 182 includes at least one wall 184 that forms a volume through which air flows. In other words, the deflection member 182 is hollow. The at least one wall 182 may be any number of thicknesses and may be any number of lengths (e.g., depending on the size of a tire in which the air deflector 150 is to be installed). In the embodiment shown in FIGS. 5-8, the deflection member 182 includes a first end 186 (e.g., a first open end; a first air output end) and a second end 188 (e.g., a second open end; a second air output end). The attachment portion 180 extends away from the deflection member 182 at a position between the first end 186 and the second end 188 (e.g., centered between the first end 186 and the second end 188 of the deflection member 182). The first end 186 and the second end 188 form air outputs 189 (e.g., a first air output opening and a second air output opening, respectively) out of the air deflector 150, respectively.

The deflection member 182 of the air deflector 150 (e.g., the air output openings 189) may be any number of shapes (e.g., circumferential, elliptical, squared, rectangular, irregular, undefined). For example, the deflection member 182 may be tubular with any number of cross-sectional shapes including, for example, circular, irregular, or square. For example, referring to FIGS. 5 and 6, the first embodiment of the air deflector 150 includes a deflection member 182 that is a rounded shape, and has a first portion 190 and a second portion 192 (e.g., a radially outer portion). The first portion 190 of the deflection member 182 is towards a bottom 194 of the deflection member 182 and is more tapered. The second portion 192 of the deflection member 182 is towards a top 198 of the deflection member 182 and is larger than the first portion 190 of the deflection member 182. For example, the deflection member 182 is an inverted pear shape. In other words, the second portion 192 (e.g., the radially outer portion) has a smooth radially outer surface with a larger diameter than the first portion 190. The inverted pear shape facilitates positioning of the deflection member 182 within the well 152 of the rim 122 and facilitates the movement of the beads 160 of the tire 120 away from each other and towards the first tire retaining wall 145 and the second tire retaining wall 148, respectively. Other shapes may be provided. For example, the radially outer portion 192 may have an outer surface towards the top 198 of the deflection member 182 that has a triangular cross-section, such that a peak is formed.

Figure 7:
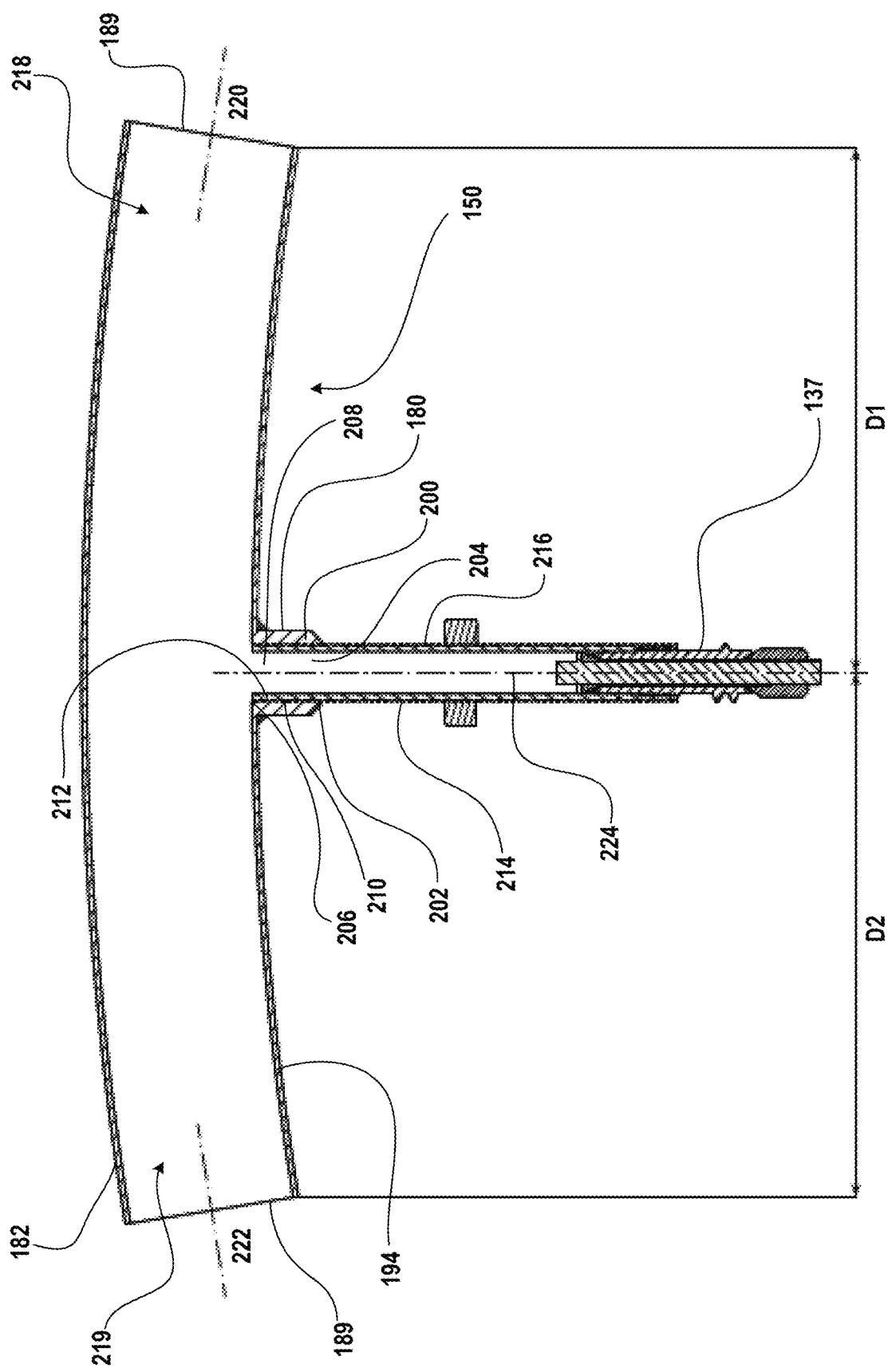
FIG. 7 is a front cross-sectional view of the first embodiment of the air deflector of FIG. 3 attached to an air valve.
Figure 8:
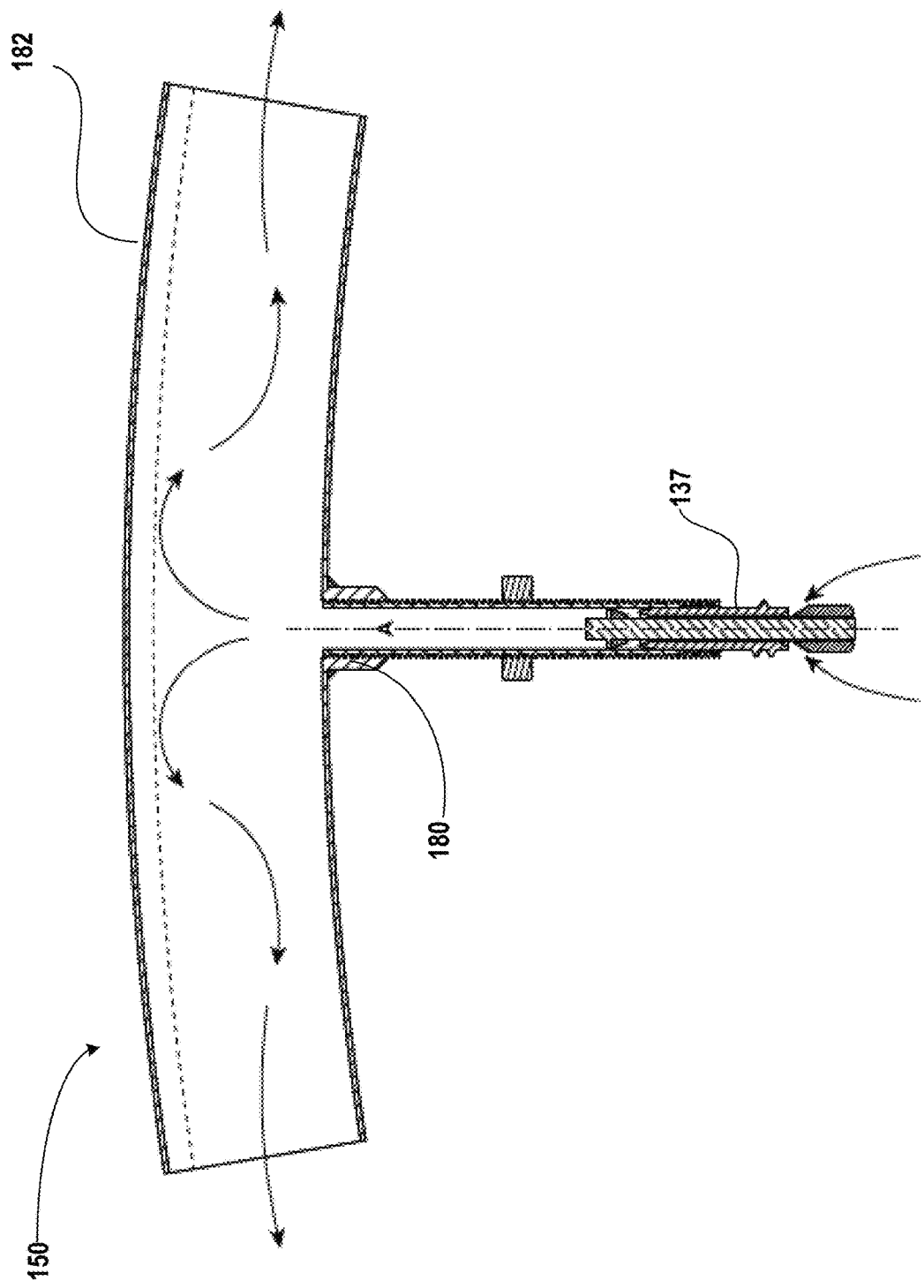
FIG. 8 illustrates exemplary deflection of airflow through the first embodiment of the air deflector of FIG. 3.

Referring to FIG. 7, the attachment portion 180 includes at least one wall 200 that surrounds a volume through which the air flows. A first end 202 (e.g., an air input end) of the at least one wall 200 forms an air input 204 (e.g., an air input opening), and a second end 206 opposite the first end 202 forms an air output 208 (e.g., an air input/output opening; output for the attachment portion 180, input for the deflection member 182). The at least one wall 200 of the attachment portion 180 may be any number of lengths and thicknesses. The length of the at least one wall 200 of the attachment portion 180 may be set based on a length of the valve 137 and the required support for the attachment between the valve 137 and the attachment portion 180.

The attachment portion 180 may be any number of shapes. For example, the attachment portion 180 may be tubular (e.g., a hollow cylinder) sized and shaped to fit through the opening 149 through the rim 122. A cross section through, for example, the tubular attachment portion may be any number of shapes including, for example, circular.

An inner surface 210 of the at least one wall 182 may be sized and shaped to match a size and shape of an outer surface of the valve 137. For example, the inner surface 210 of the at least one wall 182 includes threads 212 (e.g., inner threads) that match threads 214 (e.g., outer threads) on an outer surface 216 of the valve 137. The air deflector 150 may be attached to the valve 137 via the inner threads 212 of the at least one wall 200 of the attachment portion 180 and the outer threads 214 of the valve 137. The air deflector 150 may be attached to the valve 137 in other ways. For example, the valve 137 may include inner threads, and the attachment portion 180 may include outer threads. In such an embodiment, the air deflector 150 may be attached to the valve 137 via the inner threads of the valve 137 and the outer threads of the attachment portion 180 of the air deflector 150. In another example, the air deflector 150 is attached to the rim 122 instead of the valve 137.

Referring to FIG. 7, the air deflector 150 may be T-shaped with the attachment portion 180 extending away from, for example, the bottom 194 of the deflection member 182. For example, the deflection member 182 includes a first output arm 218 and a second output arm 219 that extend away from the attachment portion 180 and each other. The deflection member 182 splits the airflow output from the attachment portion 180 into the deflection member 182 into two different airflows (e.g., through the first output arm 218 and through the second output arm 219; see arrows illustrating airflow in FIG. 8). In other embodiments, the deflection member 182 includes more or fewer output arms (e.g., one output arm, see FIG. 12; four short output arms forming an X-shape extending away from an attachment portion).

Output air axes 220, 222 centered relative to the air output openings 189 of the deflection member 182, respectively, may be non-orthogonal (e.g., at acute angles) relative to an input air axis 224 centered relative to the air input opening 204 of the attachment portion 180. For example, the output air axis 220 may be at a positive acute angle relative to the input air axis 224, and the output air axis 22 may be at a negative acute angle relative to the input air axis 224. In other words, the deflection member 182 may be curved (e.g., to follow a curvature of the rim 122). The air output openings 189 are at distances away from the input air axis 224, respectively. The distances D1, D2 from the input air axis 224 may be the same or may be different. In other words, one of the output arms 218 may be longer than the other of the output arms 219. In another embodiment, the output air axes 220, 222 are orthogonal relative to the input air axis 224. In other words, the deflection member 182 is not curved.

The air deflector 150 may be made of any number of different materials. The air deflector 150 may be made of a rigid material or a compliant material (e.g., rubber). For example, the air deflector 150 may be made of a same material as the rim 122 (e.g., a composite material). The air deflector 150 may be made of a single material or may be made of two or more materials.

The air deflector 150 may be a single contiguous part. In other words, the attachment portion 180 and the deflection member 182 may be portions of a single contiguous part. Alternatively, the attachment portion 180 and the deflection member 182 may be separate parts that are attached to each other in any number of ways including, for example, with an adhesive.

Other configurations may be provided. For example, in one embodiment, the air deflector 150 includes at least one wall that defines the air input end 202 and the air output end 186. The at least one wall may include, for example, a plate (e.g., a curved plate) that defines at least the air output end 186, and an annular wall that defines the attachment portion 180. The curved plate, for example, may be curved to match a circumference of the rim 122 or the tire 120. The curved plate may be supported by the attachment portion 180 with one or more structural supports extending between the attachment portion 180 and the curved plate, such that the curved plate is disposed between the rim 122 and the tire 120. In such an embodiment, the curved plate acts as a shield, deflecting radial airflow moving towards an inner surface of the tire 120.

Figure 9:
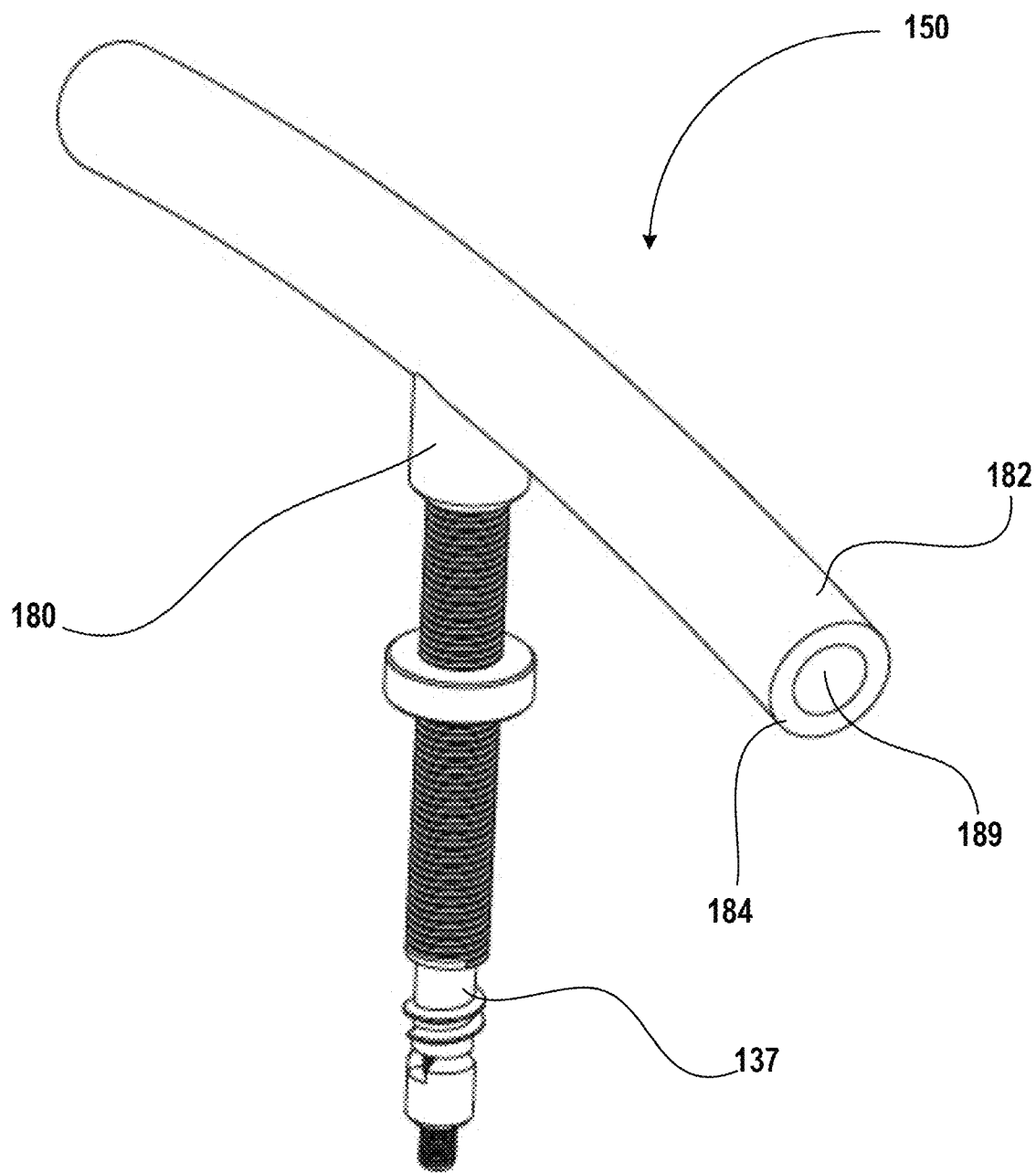
FIG. 9 is a perspective view of a second embodiment of an air deflector attached to an air valve.
Figure 10:
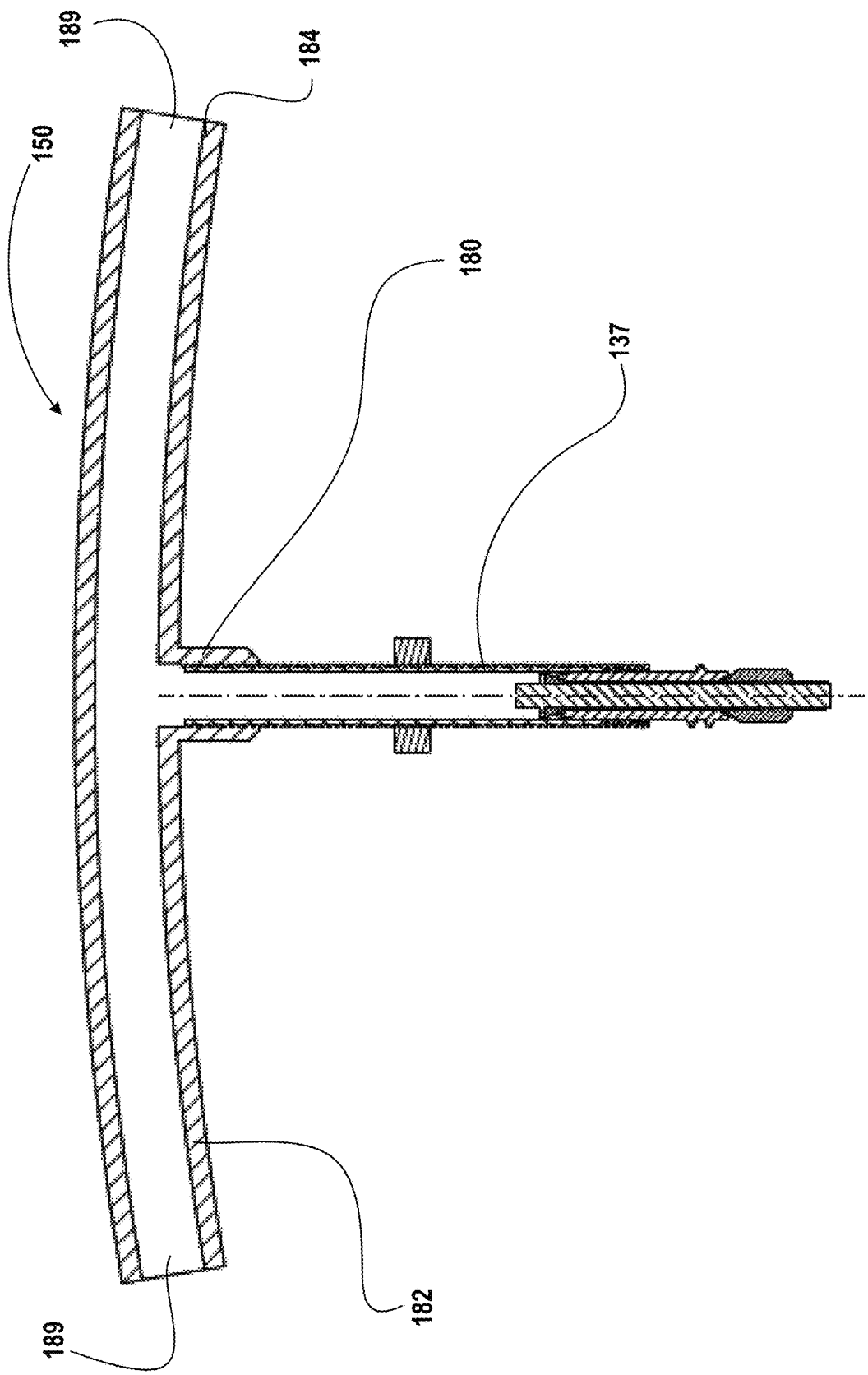
FIG. 10 is a front cross-sectional view of the second embodiment of the air deflector of FIG. 9 attached to an air valve.
Figure 11:
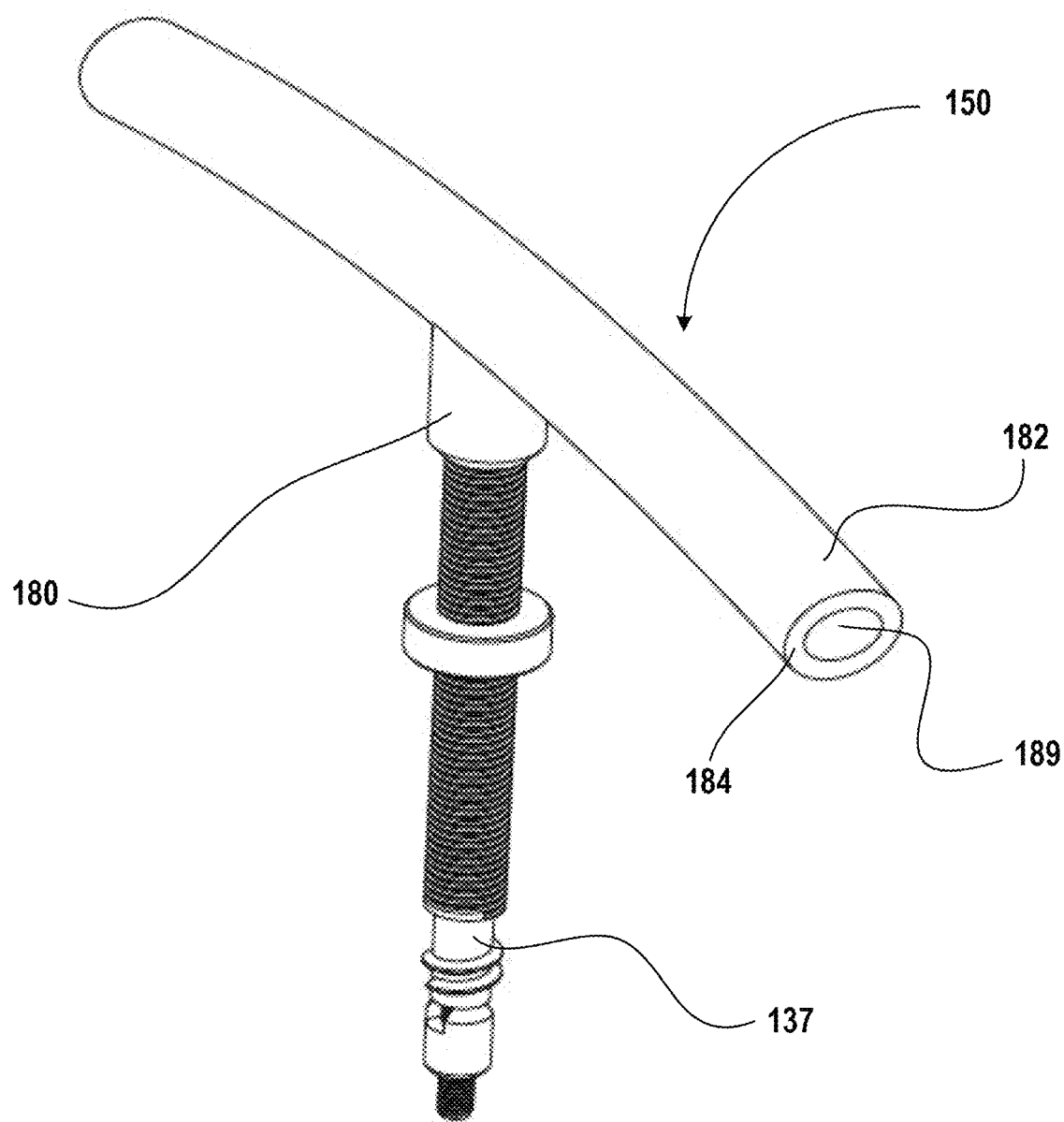
FIG. 11 is a perspective view of a third embodiment of an air deflector attached to an air valve.

As another example, as shown in FIGS. 9 and 10, a cross-section of the deflection member 182 may be circular in shape, and the at least one wall 184 of the deflection member 182 may be thicker compared to the first embodiment shown in FIGS. 5-8. The thicker deflection member 182 may help maintain the shape of the air deflector 150 and prevent the closing of the air output openings 189 of the deflection member 182. Alternatively, as shown in FIG. 11, a cross-section of the deflection member 182 may be oval shaped and may be thicker compared to the first embodiment shown in FIGS. 5-8.

Figure 12:
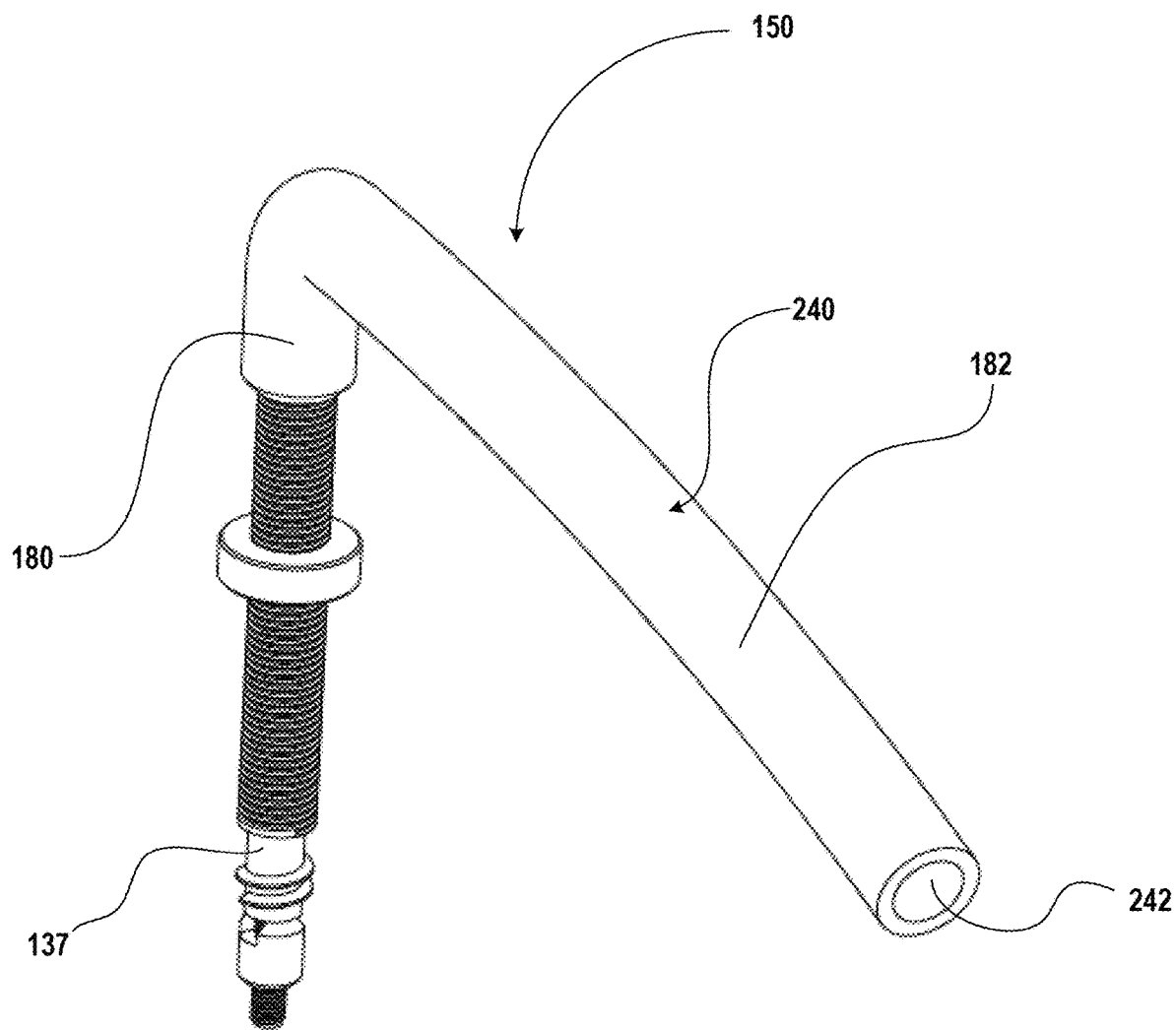
FIG. 12 is a perspective view of a fourth embodiment of an air deflector attached to an air valve.

As shown in FIG. 12, the deflection member 182 may include a single output arm 240, such that all of the air input into the air deflector 150 via the attachment portion 180 is output into the volume between the rim 122 and the tire 120 via the single output arm 240. In other words, the deflection member 182 includes a single air output opening 242 through which all of the air input into the air deflector 150 exits the air deflector 150. In one embodiment, the deflector 150 is shaped as a bent tube or a curved tube.

Figure 13:
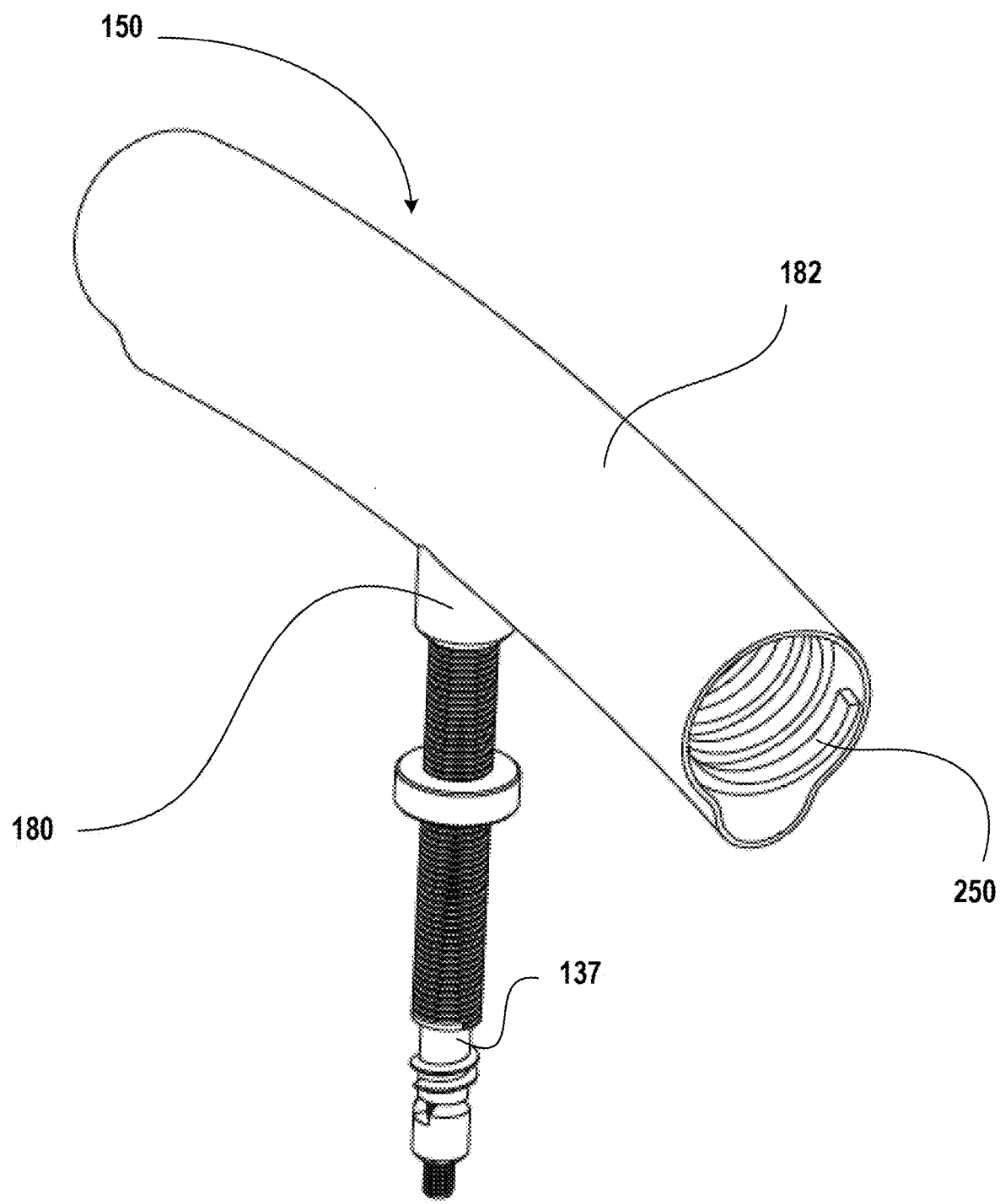
FIG. 13 is a perspective view of a fifth embodiment of an air deflector attached to an air valve.
Figure 14:
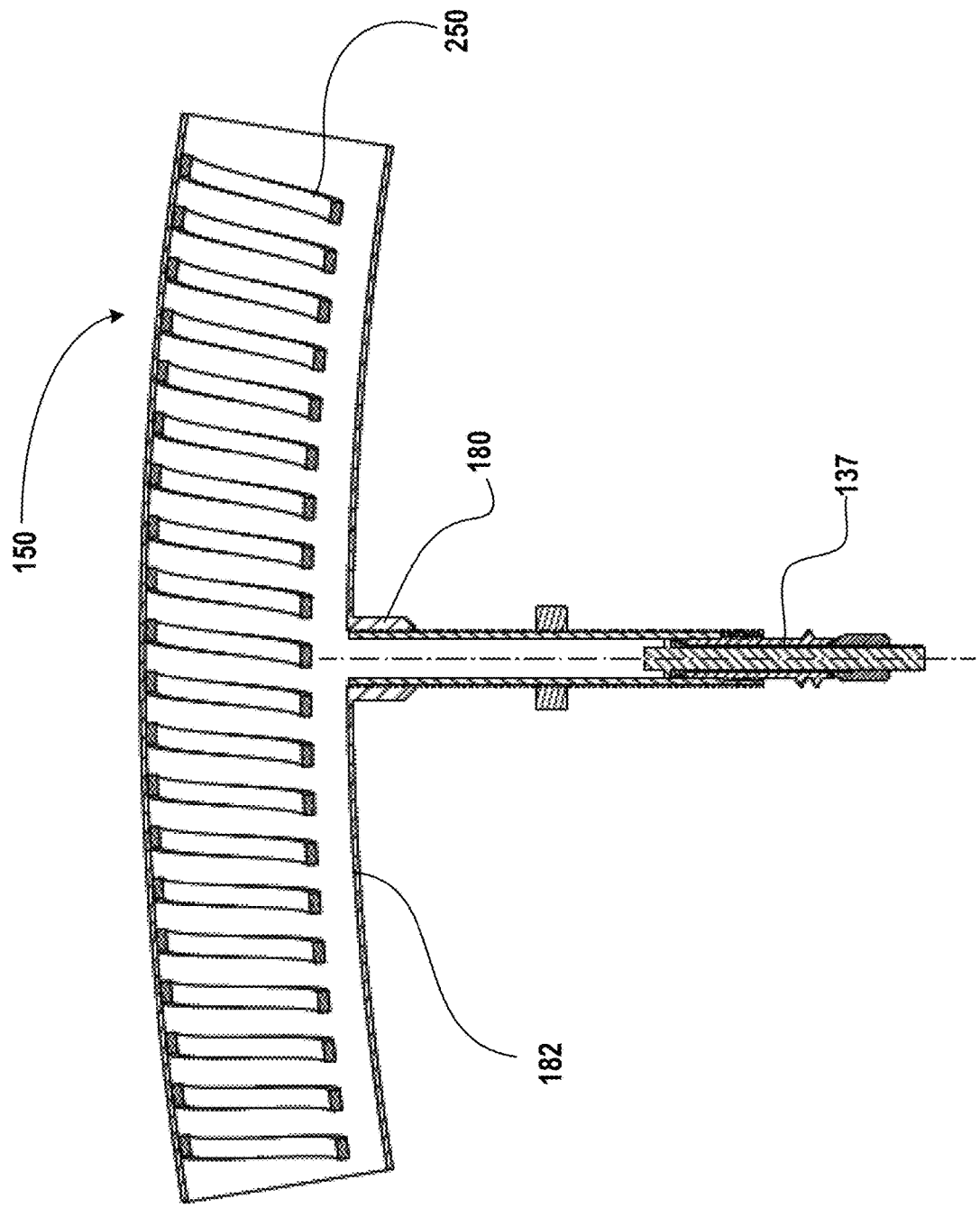
FIG. 14 is a front cross-sectional view of the fifth embodiment of the air deflector of FIG. 13 attached to an air valve.

As shown in FIGS. 13 and 14, the air deflector 150 may include one or more structural supports 250 disposed within the deflection member 182. The one or more structural supports 250 may extend along all or less than all of the length of the deflection member 182. For example, the one or more structural supports 250 may be helical shaped and may be made of a material that is more rigid than the deflection member 182. As an example, the deflection member 182 may be made of rubber, and the structural supports 250 may be made of a steel. Other materials may be used. The air deflector 150 works under high pressure, and in the case of an air deflector made of a compliant material, the one or more structural supports 250 may help maintain a shape of the deflection member 182 and prevent the deflection member 182 from collapsing. Other types of structural supports may be provided.

Figure 15:
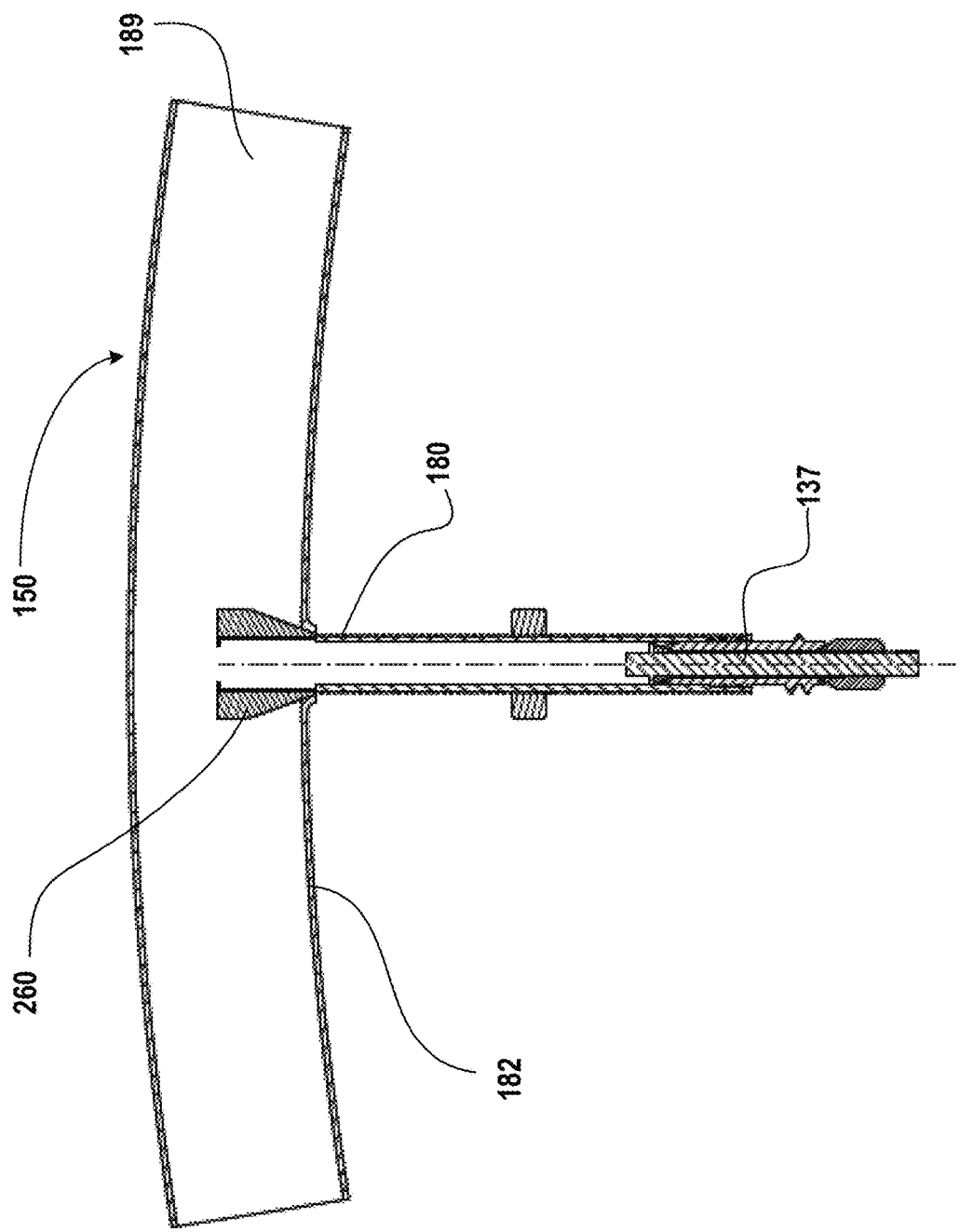
FIG. 15 is a front cross-sectional view of a sixth embodiment of an air deflector attached to an air valve.
Figure 16:
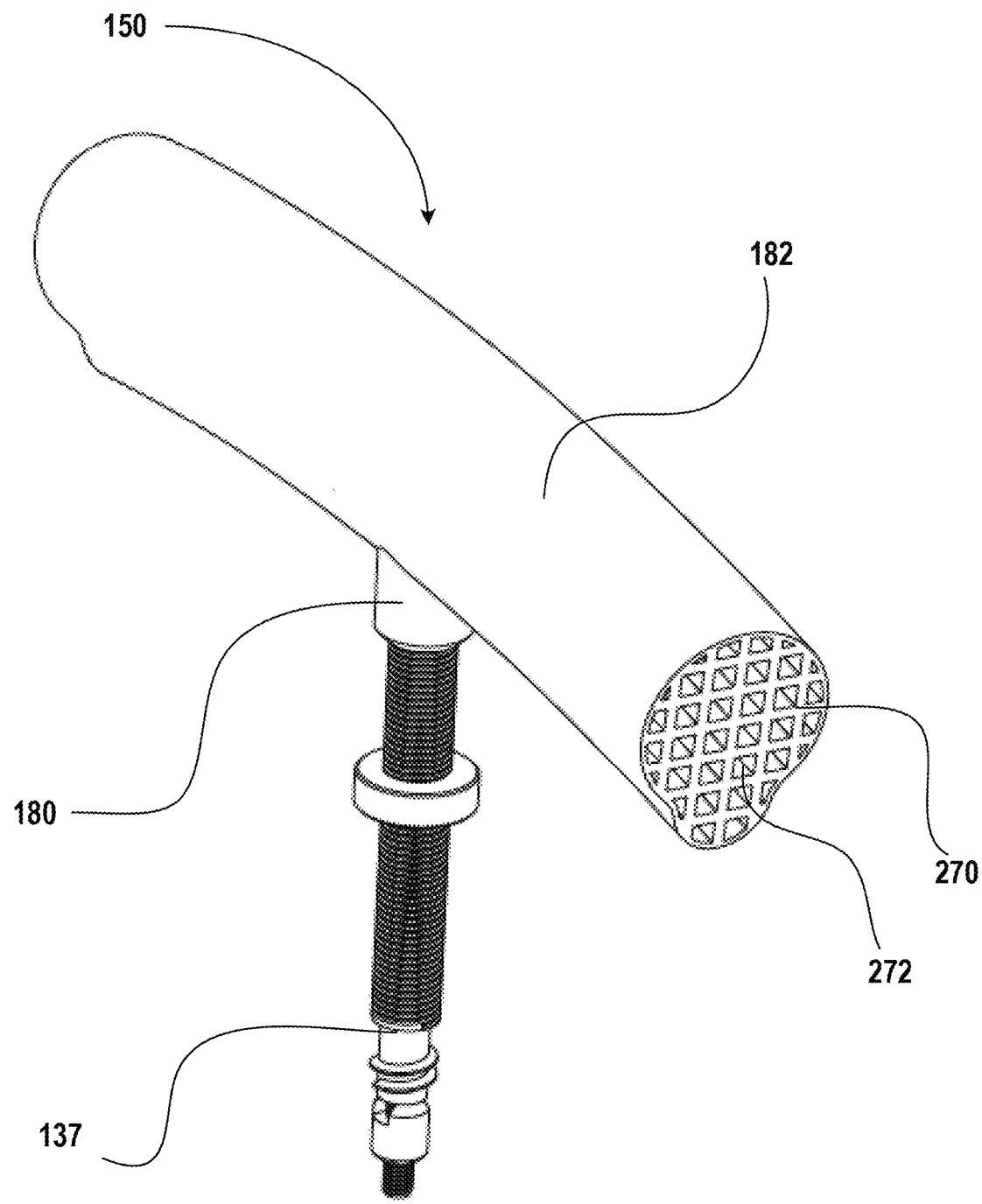
FIG. 16 is a perspective view of a seventh embodiment of an air deflector attached to an air valve.

FIGS. 15 and 16 show different examples of structures that may be provided within the deflection member 182 to help deflect the airflow and guide the airflow in a direction along the length of the deflection member 182 (e.g., out of the air output openings 189). In the embodiment shown in FIG. 15, the deflection member 182 includes a plurality of guide vanes 260 that help guide the airflow from the attachment portion 180 towards the air output openings 189. In this embodiment, the deflection member may be attached to the rim 122 and not the valve 137. In such an embodiment, the air deflector 150 may not include the attachment portion 180. The deflection member 182 may include, instead of or in addition to the guide vanes 260, one or more air diverters, air wings, air spoilers, and/or other types of air guides.

In the embodiment shown in FIG. 16, the deflection member 182 includes a lattice support 270 structure that prevents the deflection member 182 from collapsing and guides the airflow from the attachment portion 180 towards the air output openings 189. The lattice structure 270 forms a plurality of channels 272 through which the air flows towards the air output openings. Other configurations may be provided.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An air deflector disposable at least partially within a tubeless tire of a bicycle wheel, the air deflector comprising:
    a body including at least one wall defining an air input end and an air output end of the body; and
    a support structure disposed in, on, or in and on the body, wherein the body is made of a first material, and the support structure is made of a second material, the second material having a greater rigidity than the first material,
        wherein the body is attachable to a valve of the tubeless tire at the air input end, such that when air is introduced into the body via the valve, at least some of the air is deflectable by one or more walls of the at least one wall out of the body at the air output end,
    wherein the air output end is a first air output end, and an output opening is a first output opening,
        wherein the body further has a second air output end, and
        wherein the body further includes a second output opening at the second air output end of the body.

2. The air deflector of claim 1, wherein the body is a hollow body.

3. The air deflector of claim 2, wherein the body includes:
    an input opening at the air input end of the body, an input air axis being a central axis extending through the input opening; and
    an output opening at the air output end of the body,
    wherein the air output end of the body is at a distance relative to the input air axis.

4. The air deflector of claim 3, wherein the air output end faces in a direction that is at a positive acute angle relative to the input air axis.

5. The air deflector of claim 3, wherein the body is a bent tube or a curved tube.

6. The air deflector of claim 3, wherein the output opening is elliptical, square, rectangular, or circular.

7. The air deflector of claim 2, wherein the hollow body includes an input portion and an output portion, the input portion including the air input end and the output portion including a first air input end and a second air input end,
    wherein the input portion of the hollow body includes a first tubular wall of the at least one wall, and the output portion of the hollow body includes a second tubular wall of the at least one wall,
    wherein the second tubular wall includes an opening extending from an outer surface of the second tubular wall and through the second tubular wall,
    wherein the first tubular wall extends away from the second tubular wall at or adjacent to the opening through the second tubular wall, such that the air introduced into the hollow body via the valve flows into the output portion of the hollow body, is deflected by one or more inner surfaces of the second tubular wall, and exits the hollow body via the first output opening and the second output opening.

8. The air deflector of claim 7, wherein an outer surface of the output portion of the hollow body forms a peak or is rounded, such that the output portion of the hollow body is configured to space beads of the tubeless tire, in which the air deflector is disposable, apart from each other.

9. The air deflector of claim 7, further comprising an air directing member positioned at the opening through the second tubular wall, the air directing member extending into the output portion of the hollow body.

10. The air deflector of claim 1, wherein the support structure comprises a helical structure in or on the hollow body, a lattice structure in the hollow body, or a combination thereof.

11. A wheel for a bicycle, the wheel comprising:
    a central hub configured for rotational attachment to the bicycle;
    a plurality of spokes attached to the central hub and extending radially outward from the hub;
    a rim comprising:
        a radially inner portion disposed along an inner circumference of the rim, the plurality of spokes being attached to the radially inner portion of the rim;
        a first sidewall;
        a second sidewall spaced apart from the first sidewall, wherein the first sidewall and the second sidewall extend radially outward from the radially inner portion;
        a radially outer tire engaging portion disposed along an outer circumference of the rim, the radially outer tire engaging portion extending from the first sidewall and the second sidewall, respectively;
        a rim bed opposite the radially inner portion, the rim bed being between the first sidewall and the second sidewall and defining a well; and
        an opening extending from the radially inner portion of the rim, through the rim to the rim bed;
    a tire attached to the rim at the radially outer tire engaging portion of the rim; and
    an air deflection assembly comprising:
        a hollow body positioned within a volume between the rim bed and the tire, the hollow body having an air input opening and an air output opening, wherein an air input axis is a central axis that extends through the air input opening of the hollow body, the air input axis being in a direction towards an inner surface of the tire; and
        a valve extending through the opening through the rim, the valve being aligned with the air input opening of the hollow body, such that air that is introduced into the volume via the valve flows through the hollow body,
    wherein the hollow body is shaped, such that when the air is introduced into the volume via the valve, the hollow body deflects the air away from the air input axis and at least some of the air out of the hollow body at an air output end,
    wherein the hollow body of the air deflection assembly is attached to the rim, and
        wherein the hollow body is made of a same material as the rim,
    wherein the hollow body has an input portion and an output portion, the input portion including an air input end and the output portion including the air output end,
        wherein the output portion is curved, such that a curve of the output portion corresponds to a circumference of the rim bed, and
        wherein when the air is introduced into the hollow body via the valve, the output portion of the hollow body deflects at least some of the air out of the hollow body at the air output end in a circumferential direction defined by the rim.

12. The wheel of claim 11, wherein the input portion of the hollow body is a seal that is disposed within the opening through the rim.

13. The wheel of claim 11, wherein an air output axis is a central axis that extends through the air output end of the hollow body, and
   wherein a bisecting midplane formed by the air input axis and the air output axis is coplanar with a bisecting midplane of the rim, or the bisecting midplane formed by the air input axis and the air output axis is at an angle relative to the bisecting midplane of the rim, the bisecting midplane of the rim being perpendicular to an axis of rotation of the wheel.

14. An air deflector disposable at least partially within a tubeless tire of a bicycle wheel, the air deflector comprising:
   a body including at least one wall defining an air input end and an air output end of the body,
   wherein the body is attachable to a valve of the tubeless tire at the air input end, such that when air is introduced into the body via the valve, at least some of the air is deflectable by one or more walls of the at least one wall out of the body at the air output end, wherein an output portion is curved along an arc that corresponds to a circumference of a rim of the bicycle wheel on which the air deflector is installable.

\* \* \* \* \*